(12) United States Patent
Ostwal et al.

(10) Patent No.: US 12,381,664 B2
(45) Date of Patent: Aug. 5, 2025

(54) METHOD AND APPARATUS OF REPORTING AUTOMATIC REPEAT REQUEST STATUS IN A COMMUNICATION SYSTEM

(71) Applicant: SAMSUNG ELECTRONICS CO., LTD., Suwon-si (KR)

(72) Inventors: Nayan Ostwal, Bangalore (IN); Aneesh Narendra Deshmukh, Bangalore (IN); Anshuman Nigam, Bangalore (IN); Srihari Das Sunkada Gopinath, Bangalore (IN); Jiyoung Cha, Suwon-si (KR); Jungsoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 17/964,750

(22) Filed: Oct. 12, 2022

(65) Prior Publication Data
US 2023/0112796 A1    Apr. 13, 2023

Related U.S. Application Data

(63) Continuation of application No. PCT/KR2022/015094, filed on Oct. 7, 2022.

(30) Foreign Application Priority Data

Oct. 13, 2021    (IN) .............................. 202141046714

(51) Int. Cl.
*H04L 1/00* (2006.01)
*H04L 1/1822* (2023.01)
*H04L 1/1829* (2023.01)

(52) U.S. Cl.
CPC .......... *H04L 1/1864* (2013.01); *H04L 1/1822* (2013.01); *H04L 1/1861* (2013.01)

(58) Field of Classification Search
None
See application file for complete search history.

(56) References Cited

U.S. PATENT DOCUMENTS 9,853,775 B2    12/2017  Meyer et al.
2010/0182949 A1    7/2010  Ji
(Continued)

FOREIGN PATENT DOCUMENTS

| CN | 104506279 | 4/2015 |
| EP | 2718813 | 3/2021 |

(Continued)

OTHER PUBLICATIONS

Extended European Search Report dated Sep. 16, 2024 issued in European Patent Application No. 22881279.8.
(Continued)

*Primary Examiner* — Brandon M Renner
(74) *Attorney, Agent, or Firm* — Nixon & Vandehye, P.C.

(57) ABSTRACT

The disclosure relates to a method and a system of reporting Automatic Repeat Request (ARQ) status in a communication system by a receiver entity. The method comprising: receiving a bit sequence of an ARQ packet; determining a plurality of threads configured to run in parallel on at least one part of the bit sequence; detecting reception status of one or more bits in the at least one part of the bit sequence by running in parallel the plurality of threads on the at least one part of the bit sequence; compiling the reception status of one or more bits from the plurality of threads; and transmitting, by the receiver entity, a status report prepared based on compilation of the reception status of one or more bits from the plurality of threads to a lower layer.

20 Claims, 16 Drawing Sheets

(56) References Cited

U.S. PATENT DOCUMENTS

| | | |
|---|---|---|
| 2012/0057560 A1 | 3/2012 | Park et al. |
| 2015/0327275 A1 | 11/2015 | Kwon et al. |
| 2016/0021567 A1 | 1/2016 | Agiwal et al. |
| 2016/0212661 A1 | 7/2016 | Mallick et al. |
| 2017/0290055 A1 | 10/2017 | Koskinen |
| 2018/0007662 A1 | 1/2018 | Chai et al. |
| 2018/0152266 A1 | 5/2018 | Quan et al. |
| 2020/0412491 A1 | 12/2020 | Lu et al. |
| 2020/0412496 A1* | 12/2020 | Lu ............... H04L 1/1867 |
| 2021/0067276 A1 | 3/2021 | Wang et al. |
| 2021/0167897 A1 | 6/2021 | Seidel et al. |
| 2023/0422241 A1* | 12/2023 | Liu ............... H04L 1/0026 |
| 2024/0004704 A1* | 1/2024 | Garcia-Saavedra ............ G06F 9/4887 |
| 2024/0223307 A1* | 7/2024 | Papadopoulou ...... G06F 9/3851 |

FOREIGN PATENT DOCUMENTS

| | | |
|---|---|---|
| JP | 2018-514124 | 5/2018 |
| JP | 6336069 | 6/2018 |
| KR | 10-1669966 | 10/2016 |
| KR | 10-2020-0098625 | 8/2020 |
| KR | 10-2021-0035901 | 4/2021 |
| WO | 2021/080784 | 4/2024 |

OTHER PUBLICATIONS

Search Report and Written Opinion dated Jan. 18, 2023 issued in International Patent Application No. PCT/KR2022/015094.

"3GPP; TSG RAN; NR; Radio Link Control (RLC) protocol specification (Release 16)", Jan. 6, 2021, 35 pages.

"R2-1910295, Summary of [106#82] RLC email discussion", Aug. 15, 2019, 35 pages.

"3GPP; TSG RAN; Radio Link Control (RLC) protocol specification (Release 16)", Jul. 18, 2020, 92 pages.

Indian Office Action issued Sep. 8, 2023 in corresponding Indian Patent Application No. 202141046714.

\* cited by examiner

| | | | | | | | | |
|---|---|---|---|---|---|---|---|---|

| D/C | CPT | START_SN | | | | | | Oct 1 |
|---|---|---|---|---|---|---|---|---|
| START_SN | | | | | | | | Oct 2 |
| START_SN | | | | | | R | R | Oct 3 |
| ACK_SN | | | | | | | | Oct 4 |
| ACK_SN | | | | | | | | Oct 5 |
| ACK_SN | E1 | R | R | R | R | R | | Oct 6 |
| NACK_SN | | | | | | | | Oct 7 |
| NACK_SN | | | | | | | | Oct 8 |
| NACK_SN | E1 | E2 | E3 | R | R | R | | Oct 9 |
| SOstart | | | | | | | | Oct 10 |
| SOstart | | | | | | | | Oct 11 |
| SOend | | | | | | | | Oct 12 |
| SOend | | | | | | | | Oct 13 |
| NACK range | | | | | | | | Oct 14 |
| NACK_SN | | | | | | | | Oct 15 |
| NACK_SN | | | | | | | | Oct 16 |
| NACK_SN | E1 | E2 | E3 | R | R | R | | Oct 17 |
| ... | | | | | | | | Oct 18 |

Status PDU with 18 bit SN
CPT = 001

FIG.4A

| D/C | CPT | START_SN | | | | Oct 1 |
|---|---|---|---|---|---|---|
| START_SN | | | | | | Oct 2 |
| ACK_SN | | | | | | Oct 3 |
| ACK_SN | | E1 | R | R | R | Oct 4 |
| NACK_SN | | | | | | Oct 5 |
| NACK_SN | | E1 | E2 | E3 | R | Oct 6 |
| NACK_SN | | | | | | Oct 7 |
| NACK_SN | | E1 | E2 | E3 | R | Oct 8 |
| SOstart | | | | | | Oct 9 |
| SOstart | | | | | | Oct 10 |
| SOend | | | | | | Oct 11 |
| SOend | | | | | | Oct 12 |
| NACK range | | | | | | Oct 13 |
| NACK_SN | | | | | | Oct 14 |
| NACK_SN | | E1 | E2 | E3 | R | Oct 15 |
| ... | | | | | | Oct 16 |

Status PDU with 12 bit SN
CPT = 001

| | | | |
|---|---|---|---|
| D/C | CPT | ACK_SN | Oct 1 |
| ACK_SN | | | Oct 2 |
| ACK_SN | E1 | R | Oct 3 |
| NACK_SN | | | Oct 4 |
| NACK_SN | | | Oct 5 |
| NACK_SN | E1 E2 E3 | R R R | Oct 6 |
| NACK_SN | | | Oct 7 |
| NACK_SN | | | Oct 8 |
| NACK_SN | E1 E2 E3 | R R R | Oct 9 |
| SOstart | | | Oct 10 |
| SOstart | | | Oct 11 |
| SOend | | | Oct 12 |
| SOend | | | Oct 13 |
| NACK range | | | Oct 14 |
| NACK_SN | | | Oct 15 |
| NACK_SN | | | Oct 16 |
| NACK_SN | E1 E2 E3 | R R R | Oct 17 |
| ... | | | Oct 18 |

Status PDU with 18 bit SN in 38.322

FIG.9A

| | | | | | | | |
|---|---|---|---|---|---|---|---|

| D/C | CPT | START_SN | Oct 1 |
|---|---|---|---|
| START_SN | | | Oct 2 |
| START_SN | | R | R | Oct 3 |
| ACK_SN | | | | Oct 4 |
| ACK_SN | | | | Oct 5 |
| ACK_SN | E1 | R | R | R | R | R | Oct 6 |
| NACK_SN | | | | Oct 7 |
| NACK_SN | | | | Oct 8 |
| NACK_SN | E1 | E2 | E3 | R | R | R | Oct 9 |
| SOstart | | | | Oct 10 |
| SOstart | | | | Oct 11 |
| SOend | | | | Oct 12 |
| SOend | | | | Oct 13 |
| NACK range | | | | Oct 14 |
| NACK_SN | | | | Oct 15 |
| NACK_SN | | | | Oct 16 |
| NACK_SN | E1 | E2 | E3 | R | R | R | Oct 17 |
| ... | | | | Oct 18 |

Status PDU with 18 bit SN
CPT = 001 as proposed and added field START_SN

FIG.9B

METHOD AND APPARATUS OF REPORTING AUTOMATIC REPEAT REQUEST STATUS IN A COMMUNICATION SYSTEM

CROSS-REFERENCE TO RELATED APPLICATIONS

This application is a continuation of International Application No. PCT/KR2022/015094, designating the United States, filed on Oct. 7, 2022, in the Korean Intellectual Property Receiving Office and claiming priority to Indian Complete Patent Application number 202141046714, filed on Oct. 13, 2021, in the Indian Patent Office, the disclosures of each of which are incorporated by reference herein in their entireties.

BACKGROUND

Field

The disclosure relates to the field of communication system. For example, the disclosure relates to methods and apparatuses for reporting Automatic Repeat Request (ARQ) status in the communication system by a receiver entity.

Description of Related Art

The disclosure relates broadly to 3rd Generation Partnership Project Radio Link Layer (RLC) protocol. The RLC of the LTE, which is a layer 2 Radio Link Protocol used in Universal Mobile Telecommunications System (UMTS) and New Radio (NR) standards use the standard Automatic Repeat Request (ARQ) with selective Acknowledgement. Typically, the ARQ is employed to recover the packets which are lost over the air.

FIG. 1A is a diagram illustrating a single length status in a conventional approach. In the existing approach lock is acquired by first thread, whereas two threads have to wait. FIG. 1B is a diagram illustrating a model of an acknowledged mode entity in RLC for ARQ in the conventional approach. The window length, which is adapted to control the flow of data, is defined as half of the Sequence Number (SN) range status Packet Data Unit (PDU). This window length is delivered together with cumulative Acknowledgement (ACK) and selective Negative Acknowledgement (NACKs) to indicate the lost PDU. FIG. 1C is a diagram illustrating a sample RLC receive window in the conventional approach. FIG. 1D is a diagram illustrating a sample status PDU of the conventional approach. The transmitter is adapted to and retransmits the lost PDU to recover the loss. The RLC Transmitter (TX) of the RLC protocol specification which transmits the PDU are numbered with SN. The TX entity may also segment the given PDU when the grants are not sufficient to transmit the complete SN.

On the other hand, RLC Receiver (RX) in Acknowledgement Mode (AM) maintains a window which contains the detailed information of the received SN. An active window is defined between RX_NEXT to RX_NEXT_HIGHEST. The RX entity is adapted to send feedbacks in the form of a RLC Control PDU e.g., RLC Status PDU, to inform to the TX entity regarding the current condition of the RX window. The packets which are received, are completely acknowledged (ACKed), whereas the remaining packets are declared as negative-acknowledged (NACKed) in the Status PDU. The Status PDU assists in recovery of the packets which are NACKed by RLC RX.

For preparing a status report, the receiver traverses each SN from the RX_NEXT to RX_HIGHEST_STATUS to check the current state of the SN on whether it was fully received, not received, or partially received.

However, in a scenario, if the lower layer has a lower number of grants than the size of the prepared status PDU, then Status PDU is required to be altered. In such scenario, status PDU is required to be truncated with the modified ACK_SN such that all the NACKs below ACK_SN are captured within the available grants.

Further, after the transmission of the PDU, due to poor channel conditions, if the Status PDU losses over the channel, a lost Status PDU may result in delay in recovery. Further, for the next opportunity of preparing the Status Report, the same process of creating the entire Status PDU is required to be followed again which may further add to higher processing delays.

It is quite challenging to simultaneously manage the increasing complexity of software while decreasing the latency. Additionally, for supporting high throughput requirement of a modem communication, multiple software architectures may be employed to decompose the overall functionality of a modem into parallel cores either using functional or data decomposition method. A typical quad-core system enabled with few hardware-based encryption (HWA) such as ciphering engine, hardware parser, etc., may be used for a NR mobile handset. Further, the quad-core system may also support 4 Gbps TCP application on a modem protocol stack including data plane processing units like Packet Data Convergence Protocol (PDCP), RLC and Medium Access Control (MAC).

However, with an increase in number of parallel cores the performance of the system may deteriorate due to locks and synchronization among the parallel cores. Nevertheless, if all the parallel cores functionality are mutually exclusive with minimum or zero synchronization between them. e.g., no or minimal critical section, such design may efficiently be used for data decomposition. In order to meet the real-time requirements, one such data decomposition must be designed in a way such that a "batch of SN" may always get processed by a specific core. In other words, the SN operation for a particular SN range may be restricted to just one single specific core.

Therefore, while preparing status PDU, there is a need of traversing from RX_NEXT to RX_NEXT_HIGHEST, which may utilize any core and thus protection from parallel processing using critical section may become obligatory. In other words, the status preparation in the current form cannot be parallelized and may require the critical section across the parallel cores.

At least to address aforesaid constraints, there lies a need to address the above drawbacks, plaguing the state of the art of existing techniques of reporting ARQ status. It would further be an advancement in the state of the art to provide a status report structure which may efficiently enables such parallelization. It would further be an advancement in the state of the art to provide a mechanism for considering preparation of Status Report which can be performed in parallel threads by introducing a field START_SN by defining an alternate Status Report structure using Control PDU Type (CPT) bit field available in the existing NR specification.

SUMMARY

Embodiments of the disclosure provide a next generation RLC layer that requires an efficient way of status reporting for fast processing to meet high throughput and low latency requirements.

According to an example embodiment of the present disclosure, there is provided a method of reporting Automatic Repeat Request (ARQ) status in a communication system by a receiver entity. The method includes: receiving, by the receiver entity, a bit sequence of an ARQ packet; determining a one or more computing threads by the receiver entity configured to run in parallel on at least one part of the bit sequence. Generally, the threads are the component of a process and may be considered as the smallest sequence of programmed instructions which can be autonomously handled by a scheduler of the operating system. Further, these threads exhibit multithreading capabilities, due to which the multiple threads of a given process may be executed concurrently. Further, these threads also exhibit sharing of resources such as memory. The method may further include: detecting reception status of one or more bits in the at least one part of the bit sequence by running in parallel the plurality of threads on the at least one part of the bit sequence; compiling the reception status of one or more bits from the plurality of threads; and transmitting a status report prepared based on the compilation of the reception status of one or more bits from the plurality of threads to a lower layer.

According to an example embodiment of the present disclosure, there is provided an apparatus for reporting Automatic Repeat Request (ARQ) status in a communication system. The apparatus comprising: a transceiver, and a processor configured to: receive, via the transceiver, a bit sequence of an ARQ packet; determine a plurality of threads configured to run in parallel on at least one part of the bit sequence; detect reception status of one or more bits in the at least one part of the bit sequence by running in parallel the plurality of threads on the at least one part of the bit sequence; compile the reception status of one or more bits from the plurality of threads; and transmit, via the transceiver, a status report prepared based on the compilation of the reception status of one or more bits from the plurality of threads.

According to an example embodiment of the present disclosure, there is provided an Automatic Repeat Request (ARQ) status message for communication by a receiver entity in a 5G communication network. The ARQ status message comprising: an ARQ Status packet comprising a bit sequence to be received at receiver entity. The bit sequence further comprising: a Data/Control Bit (D/C) denoting the control bit for the Packet Data Unit (PDU; a Control PDU Type (CPT) denoting a frame format (CPT-000 or CPT-001) with which the status report is sent; a START_SN denoting a sequence of the received PDU from which the status report starts; an ACK_SN denoting a sequence of the received PDU until the status report is prepared; and a status report prepared for transmission by the receiver entity based on the compilation of the reception status of one or more bits from the plurality of threads to a lower layer.

To further clarify the advantages and features of the present disclosure, a more particular description of the disclosure will be rendered by reference to various example embodiments thereof, which are illustrated in the appended drawings. It is appreciated that these drawings depict example embodiments of the disclosure and are therefore not to be considered limiting of its scope. The present disclosure will be described and explained with additional specificity and detail with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 4A and 4B are diagrams illustrating an example Status PDU format with 18-bit SN with CPT=001 and with 12-bit SN with CPT=001, respectively, according to various embodiments;

FIG. 9A is a diagram illustrating conventional Status PDU with 18-bit SN in 3GPP TS 38.322 as per NR;

FIG. 9B is a diagram illustrating Status PDU with 18-bit SN with CPT=001 and added field START_SN, according to various embodiments;

Figure 1A:
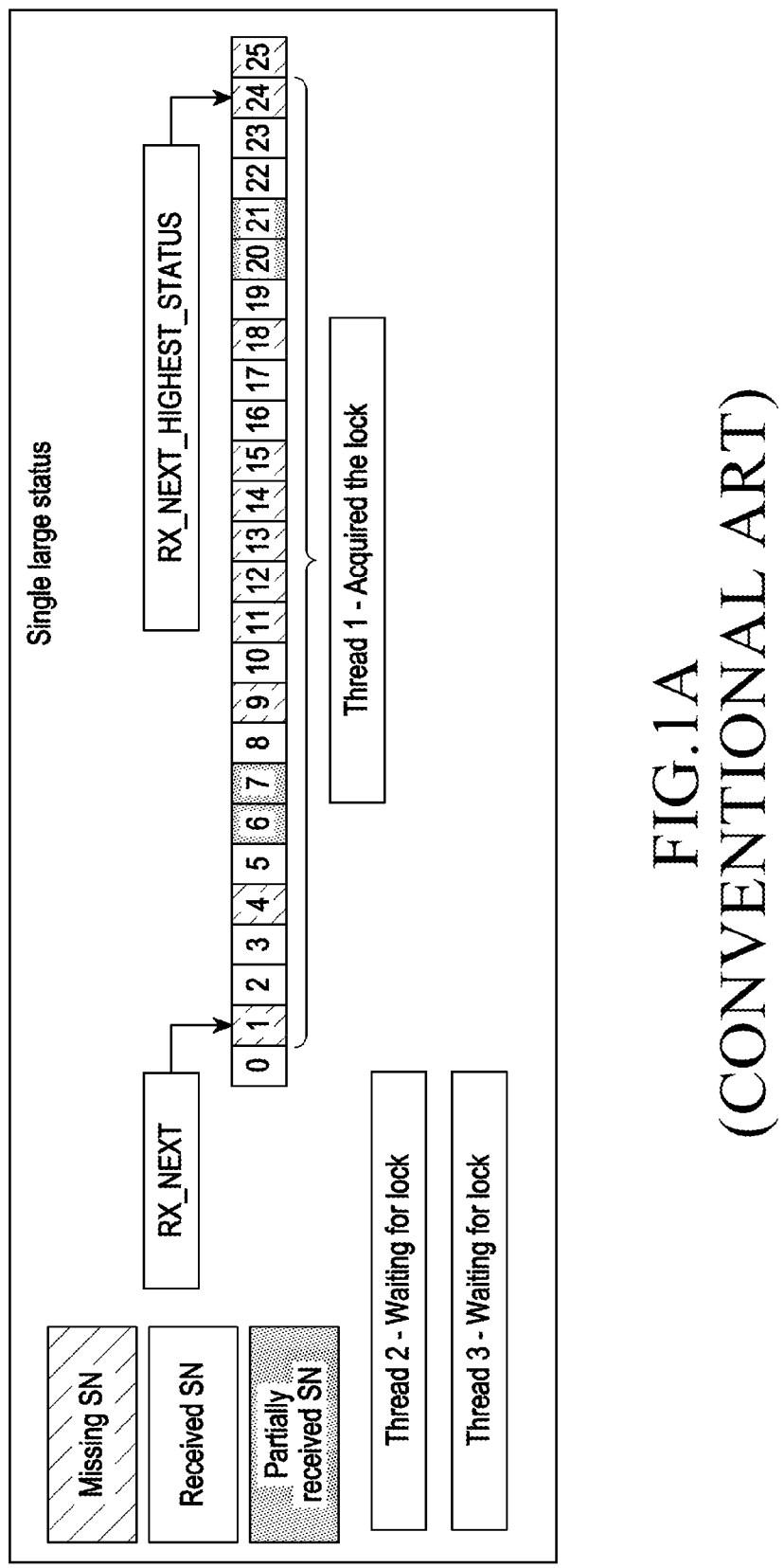
FIG. 1A is a diagram illustrating a single length status in existing approach in which lock is acquired by 1 thread, whereas two threads have to wait according to the conventional art.
Figure 1B:
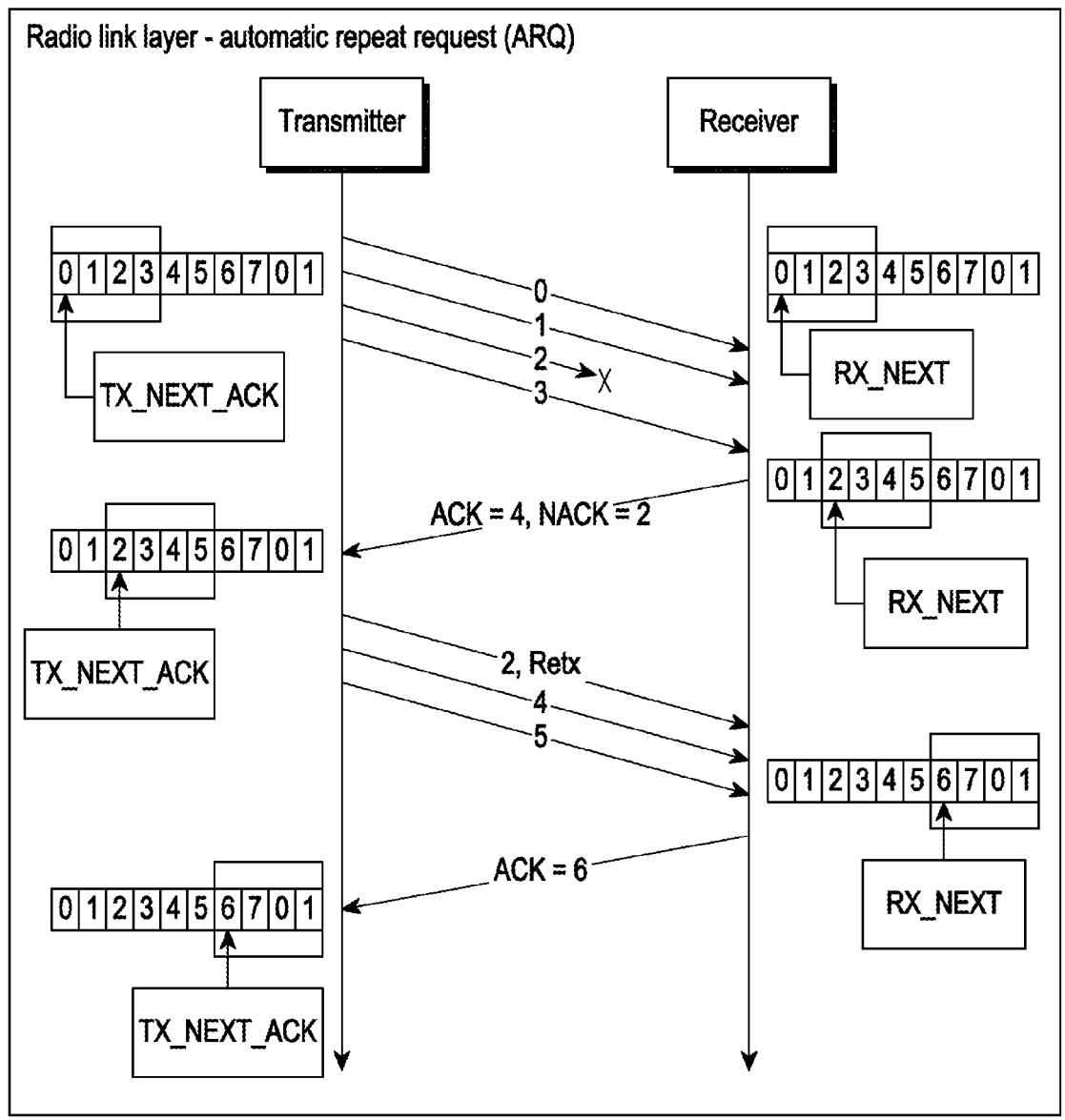
FIG. 1B is a diagram illustrating a model of an acknowledged mode entity in RLC for ARQ according to the conventional art.
Figure 1C:
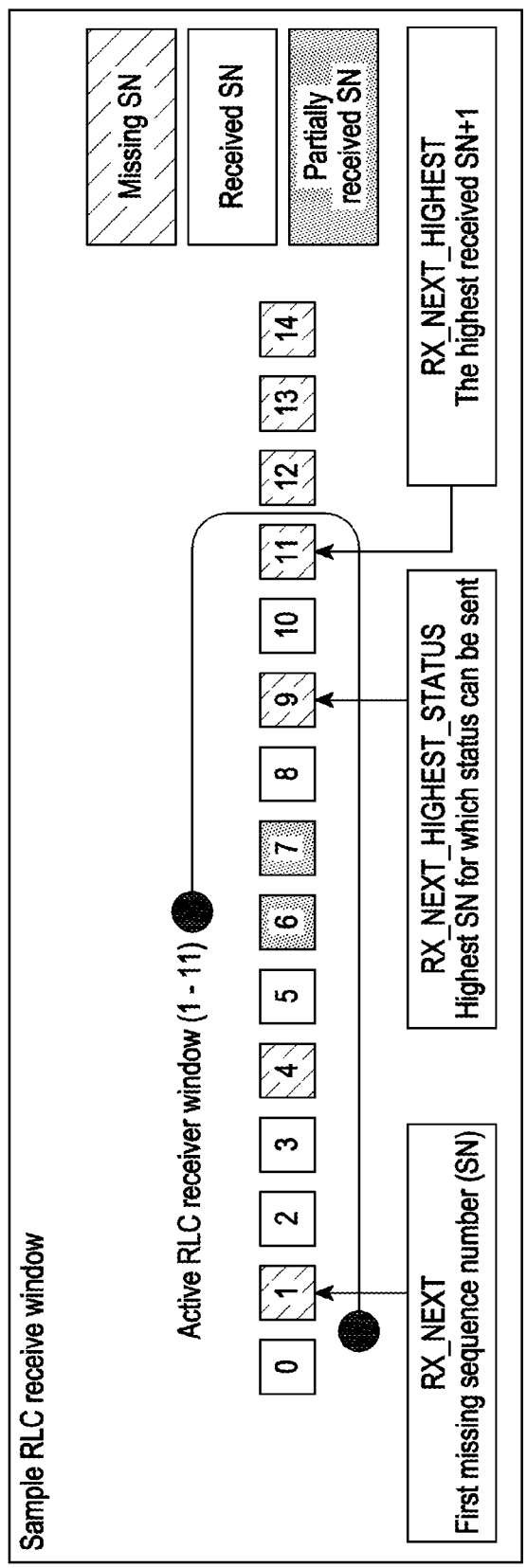
FIG. 1C is a diagram illustrating a sample RLC receive window according to the conventional art.
Figure 1D:
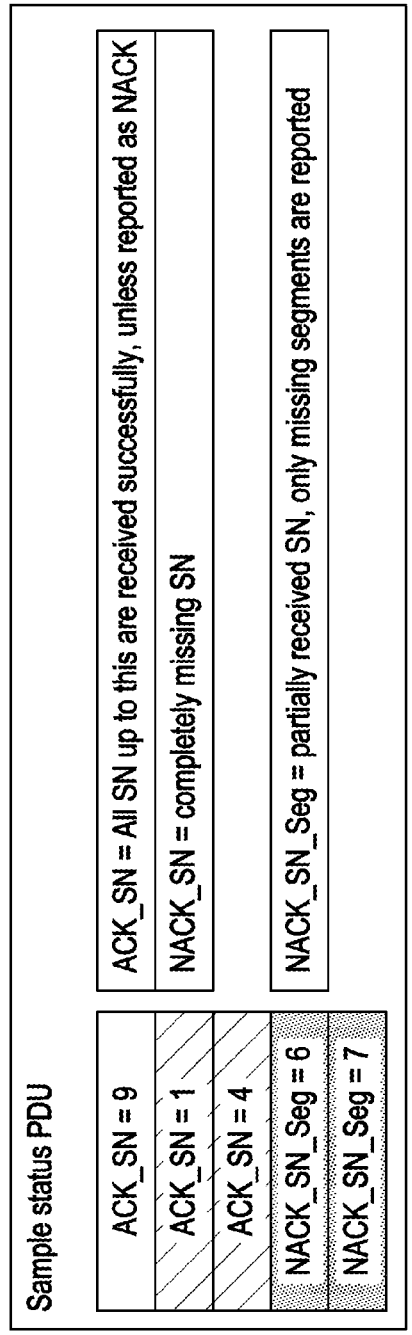
FIG. 1D is a diagram illustrating a sample status PDU according to the conventional art.

It may be noted that to the extent possible like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the present disclosure. Furthermore, the one or more elements may have been represented in the drawings by conventional symbols, and the drawings may show those specific details that are pertinent to understanding the embodiments of the present disclosure so as not to obscure the drawings with details that will be readily apparent to those of ordinary skill in the art having the benefits of the description herein.

DETAILED DESCRIPTION

It will be understood by those skilled in the art that the foregoing general description and the following detailed description are explanatory of the disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the present disclosure.

The phrase "in an embodiment", "in another embodiment" and similar language throughout this disclosure may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more system or unit or subsystems or elements or structures or components proceeded by "comprises . . . a" does not, without more constraints, preclude the existence of other elements or device or other sub-systems or other elements or other structures or other components or additional sub-systems or additional elements or additional structures or additional components.

Unless otherwise defined, all technical and scientific terms used herein have the same meaning as commonly understood by one of ordinary skilled in the art to which this disclosure belongs. The apparatus, method, and examples provided herein are illustrative and not intended to be limiting.

As discussed in the preceding description, due to an increase in number of parallel cores the performance of the system may deteriorate due to locks and synchronization among the parallel cores. Only one thread can acquire hold a lock at any given time and all the other threads have to wait for the lock to be released by the owner. This wait leads to waste of the CPU processing cycles. The present disclosure relates broadly to techniques for efficiently preparing multiple Status Reports in parallel threads, without the use of locks and saving the processing cycles, for any receiver design by providing an alternate Status Report Control PDU Type (CPT) Type=001 and further introducing a field START_SN in the Status Report structure to indicate the valid range for the smaller Status Report segment.

The present disclosure further provides a mechanism to transmit a Status Report in case received grants are not sufficient to transmit a complete Status Report and it requires to be truncated; the remaining Status Report which could not be sent out before, may be sent with the presented format in subsequent grants.

The present disclosure further provides a Status Report which enables duplicate detection for Status Report reception which increases reliability for the same.

Figure 2:
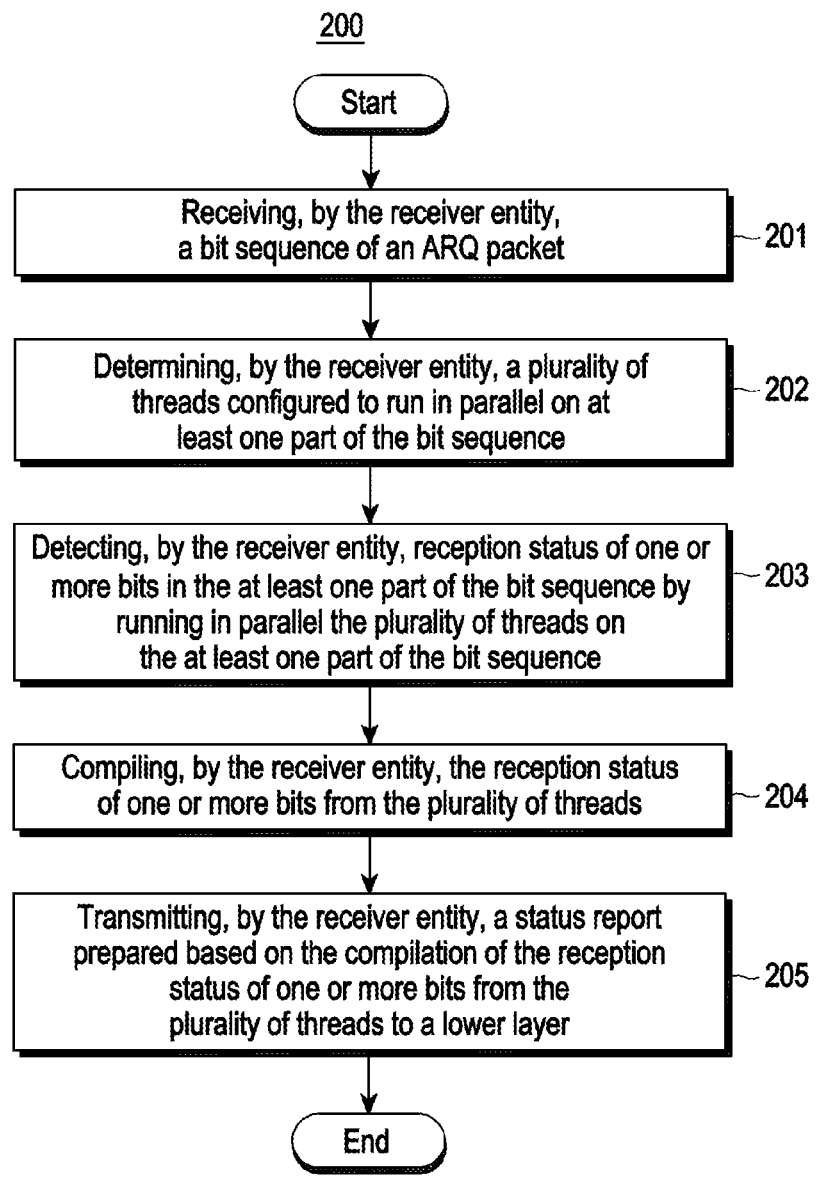
FIG. 2 is a flowchart illustrating an example method for reporting Automatic Repeat Request (ARQ) status in a communication system, according to various embodiments.

FIG. 2 is a flowchart illustrating an example method of reporting Automatic Repeat Request (ARQ) status in a communication system, according to various embodiments.

In an embodiment, there is provided a method of reporting ARQ status in a communication system by a receiver entity.

At 201, receiving, by the receiver entity, a bit sequence of an ARQ packet takes place. In an embodiment, the bit sequence is a received Packet Data Unit (PDU) allotted with a sequence number (SN).

In an embodiment, the ARQ Status packet may include: a Data/Control Bit (D/C); a Control PDU Type (CPT); a START_SN; and an ACK_SN, wherein the D/C denotes the control bit for the Packet Data Unit (PDU), wherein the CPT denotes a frame format (CPT-000 or CPT-001) with which the status report is sent, wherein the START_SN denotes a sequence of the received PDU from which the status report starts, and wherein the ACK_SN denotes a sequence of the received PDU till which the status report is prepared. In an embodiment, for a thread containing a receiving side state variable (RX_NEXT), the status report is filled with CPT-000 format and for the remaining threads, the status report is filled with CPT-001 format. In an embodiment, if the status report to be transmitted is to be truncated, the first truncated status report is sent with CPT-000, if the status report is reporting the variable (RX_NEXT) and the remaining parts of the status reports which are to be transmitted later are transmitted in blocks with CPT-001 format. In an embodiment, the status report enables the receiver entity to not update a transmitting side state variable (TX_NEXT_ACK) when the CPT value (CPT-001) is received.

At 202, the receiver entity may determine a plurality of threads configured to run in parallel on at least one part of the bit sequence. In an embodiment, determining the plurality of threads is based on one of a number of available cores, and a Packet Data Unit (PDU) Sequence Number (SN) distribution logic.

At 203, the receiver entity may detect reception status of one or more bits in the at least one part of the bit sequence by running in parallel the plurality of threads on the at least one part of the bit sequence. In an embodiment, the detecting further includes detecting, for each thread, the reception status from a Start_SN thread to an ACK_SN thread in at least one part of the bit sequence. In an embodiment, each of the determined plurality of threads include a plurality of mutually exclusive PDU SNs.

At 204, the receiver entity may compile the reception status of one or more bits from the plurality of threads.

At 205, the receiver entity may transmit a status report prepared based on the compilation of the reception status of one or more bits from the plurality of threads to a lower layer. In an embodiment, the reception status of the one or more bits is categorised as received, missed, and partially received.

In an embodiment, the method further includes activating a status prohibit timer after the transmission of all blocks of the status report to a lower layer such as Medium Access Control (MAC).

Figure 3:
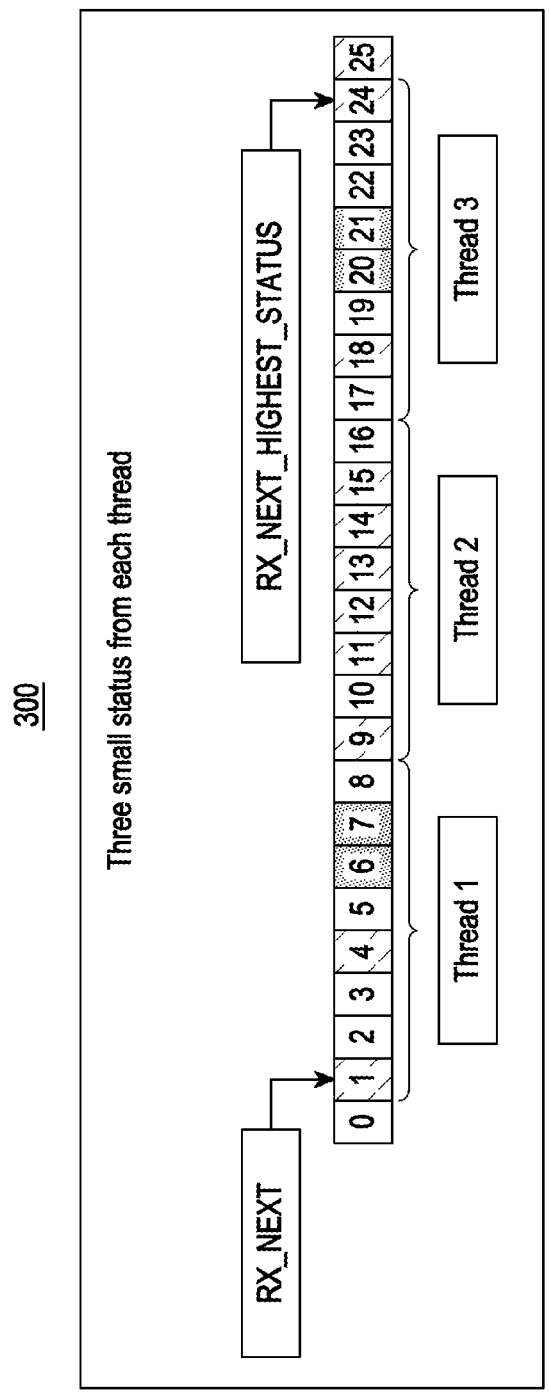
FIG. 3 is a diagram illustrating an example Status format for parallel status preparation in three threads for Status Report preparation, according to various embodiments.

FIG. 3 is a diagram illustrating an example Status format 300 for parallel status preparation in three threads for Status Report preparation, according to various embodiments. The Status format includes three small statuses from each thread. The present description of FIG. 3 corresponds to step 201 to 203 of FIG. 2.

The approach of preparing the Status format 300 according to various embodiments is adapted for creating the same status report in parallel where each status is adapted for conveying the information of the RX window as perceived from its own thread. Consequently, the present approach reduces the processing steps which in turn increases the overall speed of the processing and reduces the requirement of synchronization mechanism with other threads as well.

Figure 4B:
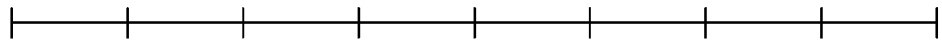

FIGS. 4A and 4B are diagrams illustrating an example Status PDU format with 18-bit SN with CPT=001 and with 12-bit SN with CPT=001, respectively, according to various embodiments.

In an embodiment, there is provided an Automatic Repeat Request (ARQ) status message for communication by a receiver entity in a 5G communication network. The ARQ status message includes an ARQ Status packet comprising a bit sequence to be received at receiver entity.

The bit sequence may further include the following bits:
a) a Data/Control Bit (D/C) denoting the control bit for the Packet Data Unit (PDU);

b) a Control PDU Type (CPT) denoting a frame format (CPT-000 or CPT-001) with which the status report is sent;
c) a START_SN denoting a sequence of the received PDU from which the status report starts;
d) an ACK_SN denoting a sequence of the received PDU till which the status report is prepared; and
e) a status report prepared for transmission by the receiver entity based on the compilation of the reception status of one or more bits from the plurality of threads to a lower layer.

In FIGS. 4A and 4B, the two status PDU defined here for 18-bit and 12-bit SN are referred as non-limiting examples.

In an implementation, a new status report procedure is rendered through which the status report may be bifurcated into multiple self-contained, fully decodable, status segments. Each bifurcated segment contains the information regarding mutually exclusive SN. These status segments may also be generated in parallel on different cores without the requirement of synchronization, which may result in performance enhancement. These self-contained fully decodable STATUS PDUs may further be sent in the same or different transport block (TB) based on the grants.

The New Status Report structure may have the following fields:
D/C (Data/Control Bit)—0 for Control PDU
CPT (Control PDU Type)—001 for Indicating "Alternate" Status Report
START_SN—Indicating that the Status Report includes the status report from this SN, including this SN.
ACK_SN—Indicating that the Status Report is up to this SN, not including this SN.

As a non-limiting implementation, the present disclosure may also be considered for 6G standards. The remaining fields such as Reserved (R) field, Extension bit 1 (E1) field, Negative Acknowledgement SN (NACK_SN) field, Extension bit 2 (E2) field, Extension bit 2 (E2) field, SO start (SOstart) field, SO end (SOend) field, and Extension bit 3 (E3) field interpretation remain the same as defined in 3GPP TS 38.322. For preparation of the Status format, primarily, the number of parallel threads for preparation the status is determined, where for each thread, the status for START_SN$_{thread}$ to ACK_SN$_{thread}$ are prepared. Further, the status report which contains lowest ACK_SN are delivered with CPT-000 format. A receiver entity (RX) may select any of the Status Report formats for transmission. As a non-limiting example, the Status Report format is backward compatible, and may continue to support Status Report for CPT 000 as well. The receiver entity is also adapted to select the number of parallel threads on which the status has to be generated. As a non-limiting example, the selection of number of parallel threads may be decided on the basis of number of available cores, or on the basis of SN distribution logic or other methods. Each parallel thread is configured to prepare its own status report between START_SN and ACK_SN which are mutually exclusive for all for all the parallel threads. The first thread which contains the status report for RX_NEXT, the status report is filled with CPT-000 bit format indicating that all the SN prior to this have successfully been acknowledged. On the other hand, for the remaining status segments of threads, the status report is filled with CPT-001 bit format indicating the status is specifically for the SNs ranging from START_SN and ACK_SN indicating in this status segment, and nothing may be assumed for SN before START_SN. A status prohibit timer is initiated, such as T-StatusProhibit timer, when all the Status Reports are submitted to a lower layer. Nevertheless, these status segments generated may or may not be transmitted in the same Medium Access Control (MAC) TB.

Figure 5:
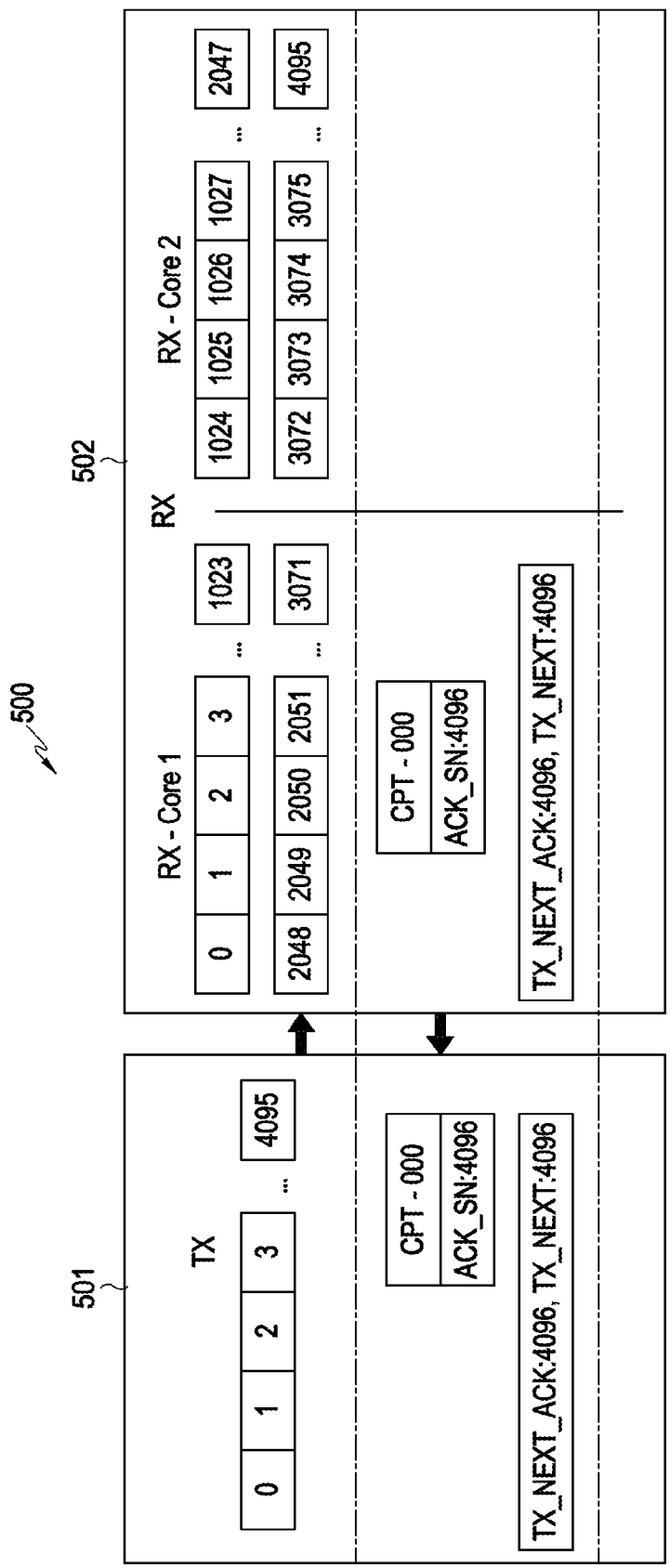
FIG. 5 is a diagram illustrating an example of parallel receiver batch processing with no loss, according to various embodiments.

FIG. 5 is a diagram illustrating an example of parallel receiver batch processing 500 with no loss, according to various embodiments. For simplicity, 1 thread for transmitter entity (TX) 501 and 2 parallel threads are considered for receiver entity (RX) 502 in FIG. 5. As a non-limiting example, the present disclosure may also be applied to any number of threads. The present description of FIG. 5 may correspond to operations 202 to 205 of FIG. 2.

The processing of SN may be bound to a specific thread based on the below-mentioned logic:

```
if ((SN Modulo 2048) < 1024)
    Process on thread 1
Else
    Process on thread 2
```

The TX 501 transmitted SN from 0 to 4095 and there was no loss of SN.
RX_NEXT=4096,
RX_NEXT_HIGHEST=4096,
RX_NEXT_HIGHEST_STATUS=4096

As both RX_NEXT and RX_NEXT_HIGHEST are same, the status report does not need to traverse at all, and a single status report is generated with ACK_SN=4096 and CPT=000 indicating that everything up to 4096 is received successfully.

Figure 6:
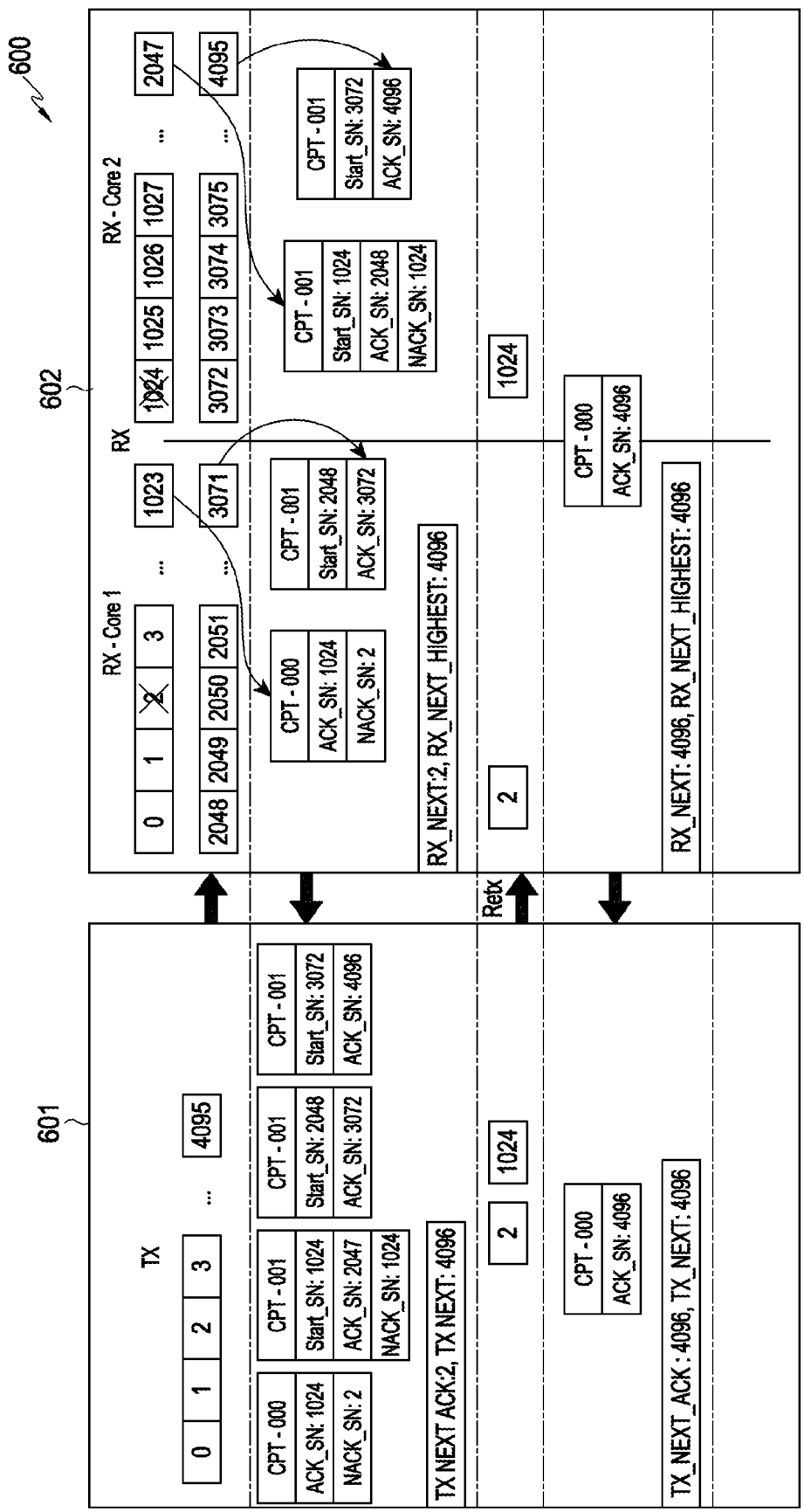
FIG. 6 is a diagram illustrating an example of parallel receiver batch processing with SN loss, according to various embodiments.

FIG. 6 is a diagram illustrating an example of parallel receiver batch processing 600 with SN loss, according to various embodiments. The present description of FIG. 6 may correspond to operations 201 to 205 of FIG. 2.

Continuing from the scenario explained above, in the present example, it is considered that SN 2 and 1024 have not been received at a receiver entity (RX) 602, which was referred earlier as 502 in FIG. 5. Since Core 1 process the SN range from 0 to 1023 and 2048 to 3071 (all inclusive) and starts preparing two status segments from 0 to 1023 and 2048 to 3071. Further, since no other core can process SN from 0 to 1023 and 2048 to 3071, there may be no obligation on protecting the status preparation in a lock and parallel access may also not be possible.

The present example, Core 1 prepares two status segments:
ACK_SN=1024, CPT=000, NACK_SN=2
From the aforesaid, it is illustrated that all SN up to 1023 are received correctly except SN=2.
ACK_SN=3072, CPT=001, START_SN=2048
From the aforesaid, it is illustrated that all the SN ranging from 2048 to 3071 have been received successfully with no loss.

Similarly, the other Core 2 also prepares two status segments:
ACK_SN=2048, CPT=001, START_SN=1024, NACK_SN=1024
From the aforesaid, it is illustrated that all the SN ranging from 1024 to 2047 have been received successfully but with the loss of 1024.
ACK_SN=4096, CPT=001, START_SN=3072
From the aforesaid, it is illustrated that, all the SN ranging from 3072 to 4095 have been received successfully without any loss.

After receiving all the status segments, a transmitter entity (TX) 601, which was referred earlier as 501 in FIG. 5, may conclude that only 2 and 1024 are missing and need to be retransmitted to recover the loss. Upon receiving the lost SNs, the RX_NEXT and RX_NEXT_HIGHEST both may be 4096 and thus a single status report with ACK_SN=4096 and CPT=000 may be sent.

Figure 7:
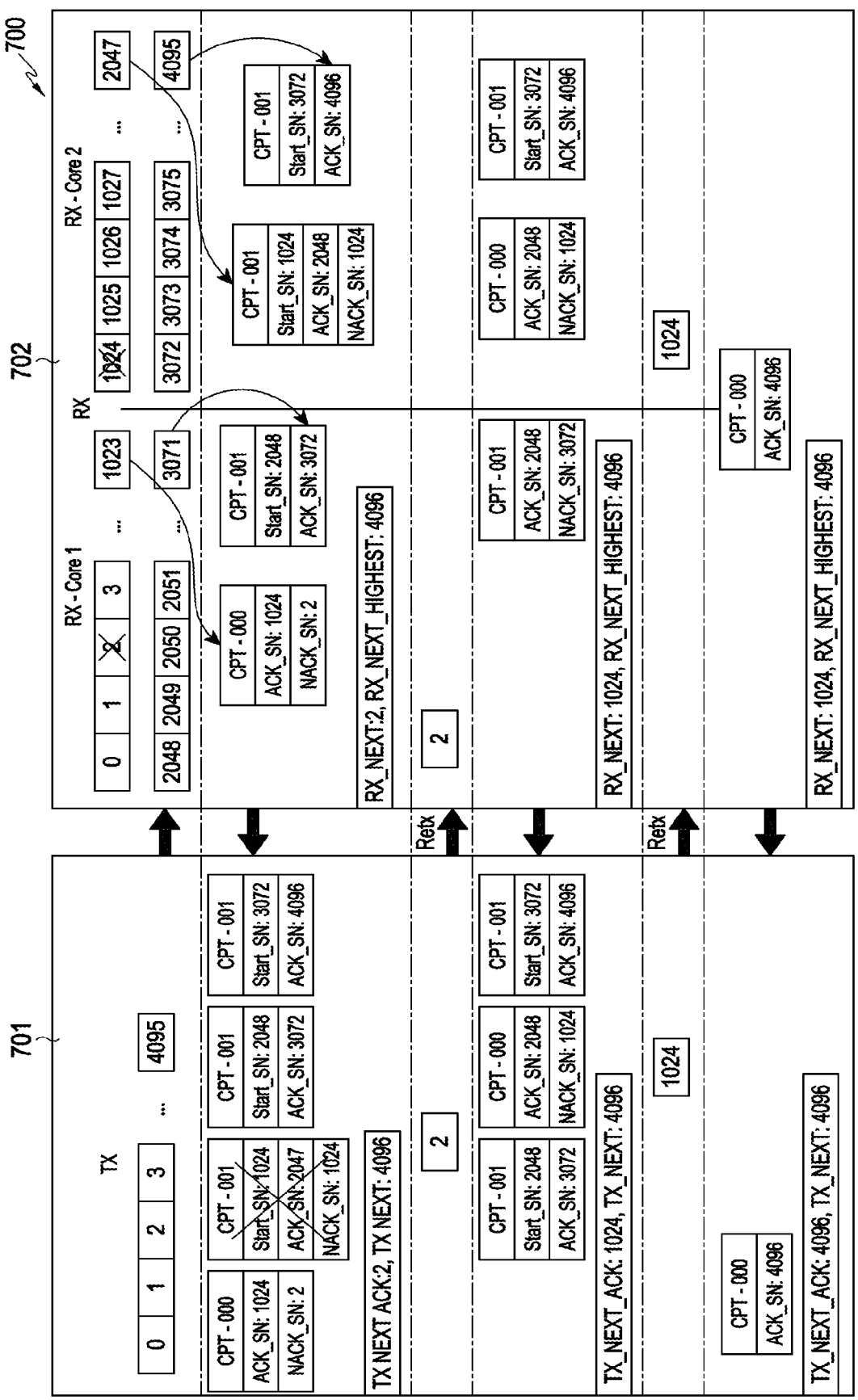
FIG. 7 is a diagram illustrating an example of parallel receiver batch processing with loss of status, according to various embodiments.

FIG. 7 is a diagram illustrating an example of parallel receiver batch processing 700 with loss of status, according to various embodiments. The present description of FIG. 7 may correspond to operations 202 to 205 of FIG. 2.

Continuing from the example explained above, in the present scenario, it is considered that one of the status segments from SN 1024 to 3071 has been lost. As one of the status segments the status has been lost, a transmitter (TX) 701, which was referred earlier as 501 in FIG. 5, does not retransmit SN 1024, however it transmits SN=2 with poll bit set.

Upon receiving the SN=2 with poll, again status report procedure may start with:
RX_NEXT=1024
RX_NEXT_HIGHEST=4096
Only one missing SN=1024

At this moment, the Core 1 is configured to send status segment from 2048 to 3071.
ACK_SN=3072, CPT=001, START_SN=2048=>

From the aforesaid, it is illustrated that all SN ranging from 2048 to 3071 are received successfully with no loss.

Further, the Core 2, prepares the below-mentioned status:
ACK_SN=2048, CPT=000, NACK_SN=1024

From the aforesaid, it is illustrated that all the SN ranging up to 2047 are received successfully but with the loss of 1024.
ACK_SN=4096, CPT=001, START_SN=3072

From the aforesaid, it is illustrated that All SN ranging from 3072 to 4095 are received successfully without any loss.

On receiving these status segments, the TX 701 performs a retransmission of SN=1024 to recover the loss. On the other hand, upon receiving the lost SNs, the RX_NEXT and RX_NEXT_HIGHEST both may be 4096 and thus a single status report with ACK_SN=4096 and CPT=000 may be sent.

In an embodiment, the present disclosure also addresses the issues related to the Status Report preparation. Since the Status Report preparation can be an intricate operation to be performed as RLC RX Window range may be as large as 131072 as per current RLC NR specification, which may be further increased in future communication systems. Further, if a status PDU is prepared after the grant reception, then based on the RX Window Range, it can take long processing time which is not desirable. Further, if in case, the status PDU is prepared in advance, e.g., before the reception of grants, then in such scenario, when grant is not sufficient, the status PDU may not be transmitted as it is not possible to segment the status PDU. Further, a status PDU may get lost over the channel which may result in further delay in the recovery of the NACKed packets. Thus, the latency of the recovery may increase even more. The embodiment discussed earlier, herein and after may also be used to address such problem as well.

In the scenario, when the Status Report with any CPT is not able to transmit due to non-availability of the grants, it may split and send multiple status reports to cover the complete window using CPT 001.

In another scenario, when the status PDU to be formed is large, a receiver entity (RX) 702, which was referred earlier as 502 in FIG. 5, may choose to prepare multiple status segments in parallel on different thread or same thread. Further, the status segments can be transmitted in the same or different Transport Block (TB). While preparing the Status PDU in a functional decomposition design, only the SNs which are part of the status segments being prepared need to be locked. In addition to the above steps, for reduction in latency, these statuses may be duplicated and transmitted multiple times to increase the redundancy. As a non-limiting example, such duplication of status can be configured by Radio Resource Control (RRC) signalling along with the T-DuplicateDetection timer value. Upon reception of first status segment, the duplication detection timer is started. All status segments containing information of the same SN within the T-DuplicateDetection timer expiry should be considered duplicate and only one retransmission should be performed. As each status segment is completely self-decodable, the TX 701 may process each status segment without waiting for the other status segments.

Figure 8:
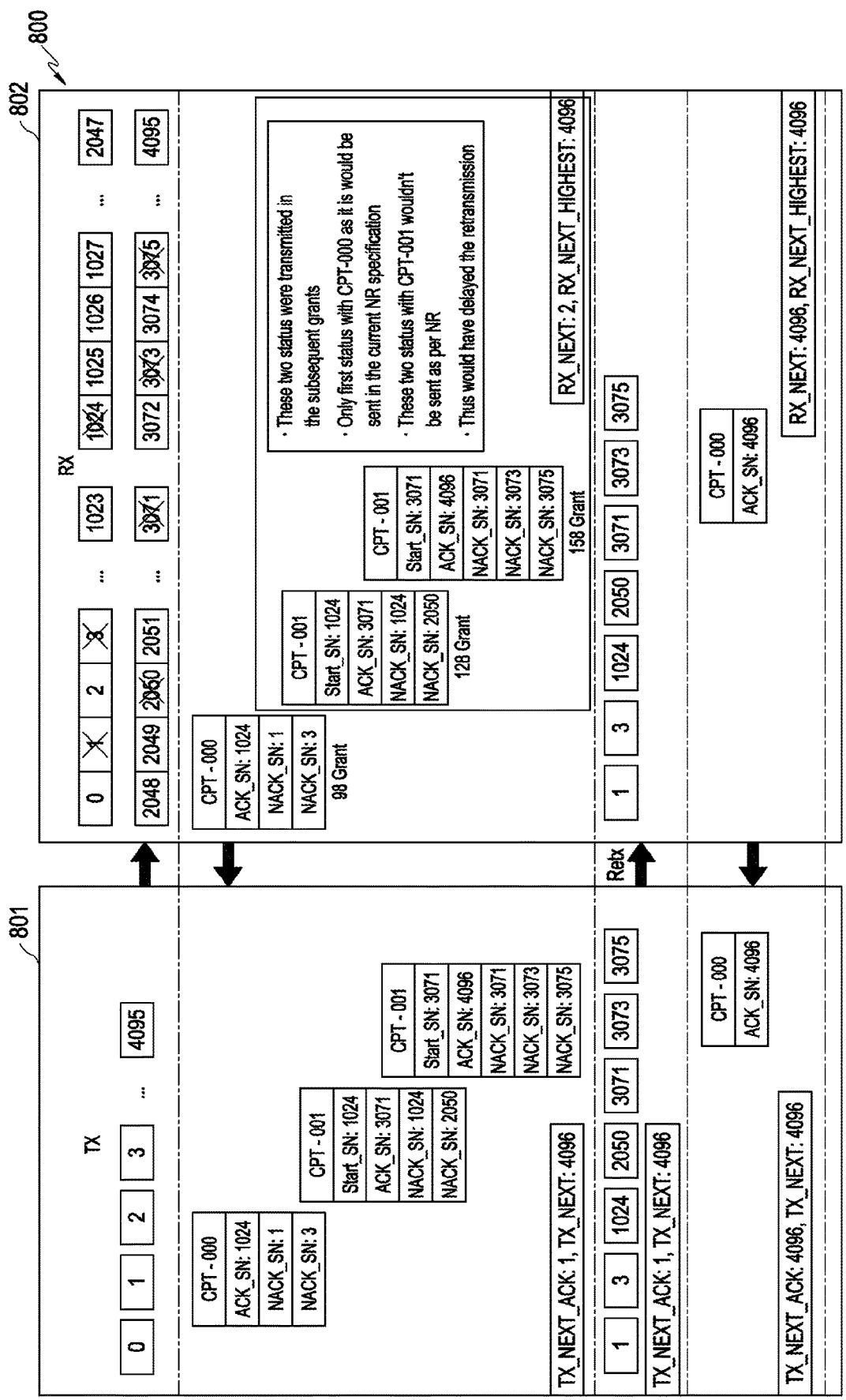
FIG. 8 is a diagram illustrating an example of status truncation due to lower grants, according to various embodiments.

FIG. 8 is a diagram 800 illustrating an example of status truncation due to lower grants, according to various embodiments.

For simplicity, only a single receiver entity (RX) 802, which was referred earlier as 502 in FIG. 5, thread is assumed in FIG. 8. The RX 802 receives SN from 0 to 4096 with multiple losses (SN: 1, 3, 1024, 2050, 3071, 3073, 3075), as referred in FIG. 8. The RX 802 further prepares a single status report with ACK_SN=4096 and NACK_SN=1, 3, 1024, 2050, 3071, 3073, 3075. The total size of the status PDU would be 24 Bytes and the grant available were only 9 Bytes. Therefore, based on the available grant, the RX 802 truncates the status and sends ACK_SN=1024, CPT=000, NACK_SN=1 and 3

From the aforesaid, it is illustrated that All SN up to 1023 are received correctly except SN=1 and 3.

Upon receiving next grant (12 Bytes), the RX 802 transmits another status segment:
ACK_SN=3071, CPT=001, START_SN=1024
NACK_SN=1024 & 2050

From the aforesaid, it is depicted that all SN ranging from 1024 to 3071 are received successfully but with the loss of 1024 and 2050.

Upon receiving next grant (>15 Bytes), the RX 802 transmits the last status segment also:
ACK_SN=4096, CPT=001, START_SN=3071
NACK_SN=3071, 3073 & 3075.

From the aforesaid, it is illustrated that all SN ranging from 3071 to 4096 are received successfully but with the loss of SN 3071, 3073 & 3075. Thus, the complete Receiver window status may be shared to a Transmitter (TX) 801, which was referred earlier as 501 in FIG. 5, in different grants. Further, the TX 801 transmits all the NACK packets and holes may be recovered.

In view of the aforesaid, there are provided various advantageous features relating to the present disclosure:
Parallel RLC Status Report preparation may help in faster reporting of the losses without taking many cycles. Effective parallelization may improve the faster recovery of the missing packets helping in achieving higher throughput.
In case of lower grants, when the Status Report can be completely reported in a single MAC TB, the present disclosure may allow the reporting of multiple Status Report in subsequent grants without requiring the need of creating complete status report again.
Having START_SN field in the Status Report with the intended use of CPT bits will help in better duplicate detection of Status Report improving reliability and better processing.

There is no side effect on any of the functionalities of the RLC specification as showcased in all the examples explained.

FIG. 9A is a diagram illustrating conventional Status PDU with 18-bit SN in 3GPP TS 38.322 as per NR and FIG. 9B is a diagram illustrating example Status PDU with 18-bit SN with CPT=001 and added field START_SN, according to various embodiments.

On receiving a positive acknowledgement for an RLC Service Data Units (SDU) with SN=x, the transmitting side of an AM RLC entity may send an indication to the upper layers of successful delivery of the RLC SDU.

For the received Status Report, if Start_SN<=TX_Next_Ack<ACK_SN, buffer, if any, at RLC related to Acknowledged SN may be freed.

Setting TX_Next_Ack equal to the SN of the RLC SDU with the smallest SN, whose SN falls within the range TX_Next_Ack<=SN<=TX_Next and for which a positive acknowledgment has not been received yet in any of the status.

When STATUS PDU (all STATUS PDUs when using CPT 001) has been submitted to lower layer, the receiving side of an AM RLC entity shall start t-StatusProhibit.

Figure 10:
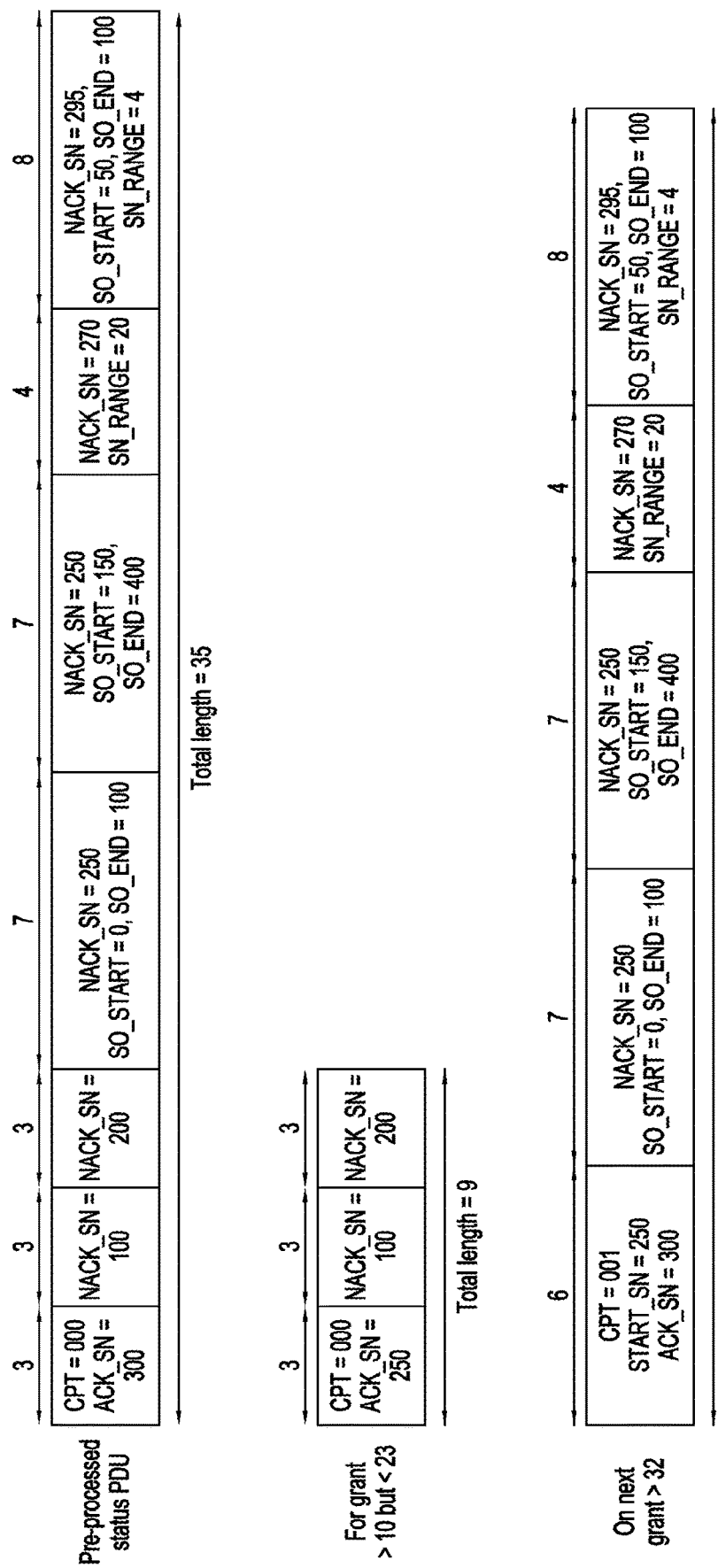
FIG. 10 is a diagram illustrating an example status truncation mechanism, according to various embodiments.

FIG. 10 is a diagram illustrating an example status truncation mechanism, according to various embodiments.

As the status PDU can grow very large, as a non-limiting example, in the order of 1000s of bytes, it must be pre-processed before receiving the MAC grants. Further, if the MAC grants are insufficient, then the status must be truncated. While truncating, it is required to ensure that ACK_SN is updated and also the E1 bit of the last NACK_ELEMENT should be made as 1.

NACK_ELEMENT: A set of E1, E2, E3, NACK_SN, NACK_RANGE, SO_START and SO_END

To achieve this, a separate metadata must be kept for each NACK_ELEMENT

---

Length or offset of the NACK element
E1 Bit location
NACK_SN
Set ACK_SN based on the below condition
If the NACK_SN of the next NACK_ELEMENT not included in the current NACK_ELEMENT
    ACK_SN = NACK_SN of the next NACK_ELEMENT
Else
  If NACK_RANGE > 1
    ACK_SN = NACK_SN + NACK_RANGE
    NACK_RANGE = NACK_RANGE − 1
    SO_END = 65535
Else
  It is not possible to make this NACK_ELEMENT as the last.
  Use the previous NACK_ELEMENT as the last.

---

After the grant reception, it can simply traverse the list based on length of what can be accommodated.

Set the E1 Bit to 0 using the E1 Bit location
Set ACK_SN=ACK_SN from the metadata.

Figure 11:
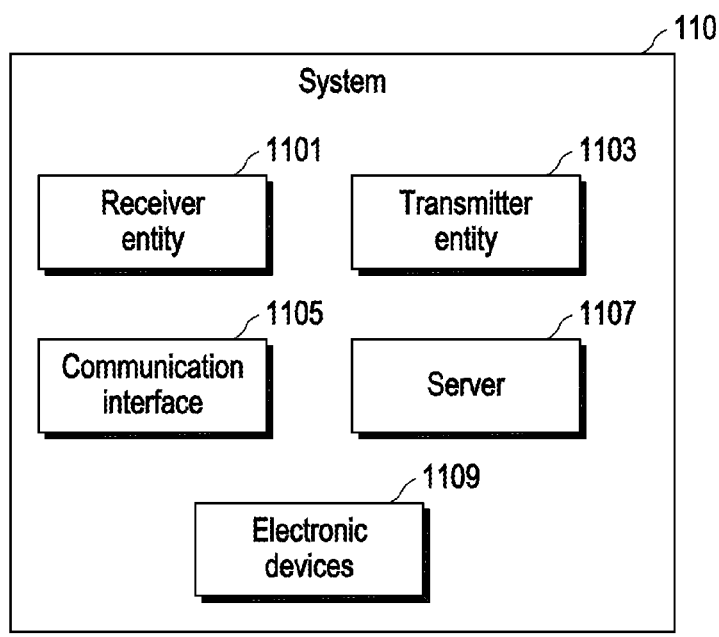
FIG. 11 is a block diagram illustrating an example configuration of a system for reporting Automatic Repeat Request (ARQ) status in a communication system, according to various embodiments.

FIG. 11 is a block diagram illustrating an example configuration of a system 1100 for reporting Automatic Repeat Request (ARQ) status in a communication system, according to various embodiments.

In an embodiment, there is provided a system 1100 of reporting Automatic Repeat Request (ARQ) status in a communication system. The system 1100 includes a receiver entity (e.g., including receiving circuitry) 1101, which is communicatively coupled with a transmitter entity (e.g., including transmitting circuitry) 1103 and a server 1107 via a communication interface (e.g., including communication circuitry) 1105. The system further communicatively coupled with one or more electronic devices 1109. Each entity of the system 1100 may also be implemented as an apparatus including a transceiver for data transmission and reception and a processor for controlling operations according to embodiments of the present disclosure.

The receiver entity 1101 of the system 1100 may include various receiver circuitry and is configured to receive a bit sequence of an ARQ packet. The receiver entity 1101 is further configured to determine a plurality of threads configured to run in parallel on at least one part of the bit sequence. The receiver entity 1101 is further configured to detect reception status of one or more bits in the at least one part of the bit sequence by running in parallel the plurality of threads on the at least one part of the bit sequence. The receiver entity 1101 is further configured to compile the reception status of one or more bits from the plurality of threads and transmit a status report prepared based on the compilation of the reception status of one or more bits from the plurality of threads.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of reporting automatic repeat request (ARQ) status in a communication system by a receiver entity, the method comprising:

receiving, by the receiver entity, a bit sequence of an ARQ packet;

determining, by the receiver entity, a plurality of threads configured to run in parallel on at least one part of the bit sequence;

detecting, by the receiver entity, reception status of one or more bits in the at least one part of the bit sequence by running in parallel the plurality of threads on the at least one part of the bit sequence;

compiling, by the receiver entity, the reception status of one or more bits from the plurality of threads; and transmitting, by the receiver entity, a status report prepared based on compilation of the reception status of one or more bits from the plurality of threads to a lower layer.

2. The method of claim 1, wherein the reception status of the one or more bits is categorized as at least one of received, missed, and partially received.

3. The method of claim 1, wherein the bit sequence is a received packet data unit (PDU) allotted with a sequence number (SN).

4. The method of claim 1, wherein the detecting comprises:
detecting, for each thread, the reception status from a Start_SN thread to an ACK_SN thread in at least one part of the bit sequence.

5. The method of claim 1, wherein, for a thread containing a receiving side state variable (RX_NEXT), the status report is filled with CPT-000 format and for the remaining threads, the status report is filled with CPT-001 format.

6. The method of claim 1, wherein based on the status report to be transmitted being truncated, the first truncated status report is sent with CPT-000, based on the status report being reported the variable (RX_NEXT) and the remaining parts of the status reports which are to be transmitted later are transmitted in blocks with CPT-001 format.

7. The method of claim 1, wherein the status report enables the receiver entity to not update a transmitting side state variable (TX_NEXT_ACK) based on the CPT value (CPT-001) being received.

8. The method of claim 1, wherein the method comprises:
activating a status prohibit timer after transmission of all blocks of the status report to a lower layer.

9. The method of claim 1, wherein determining the plurality of threads is based on one of a number of available cores, and a packet data unit (PDU) sequence number (SN) distribution logic.

10. The method of claim 1, wherein each of the determined plurality of threads include a plurality of mutually exclusive PDU SNs.

11. An apparatus for reporting automatic repeat request (ARQ) status in a communication system, the apparatus comprising:
a transceiver; and
a processor configured to:
receive, via the transceiver, a bit sequence of an ARQ packet,
determine a plurality of threads configured to run in parallel on at least one part of the bit sequence,
detect reception status of one or more bits in the at least one part of the bit sequence by running in parallel the plurality of threads on the at least one part of the bit sequence,
compile the reception status of one or more bits from the plurality of threads, and
transmit, via the transceiver, a status report prepared based on compilation of the reception status of one or more bits from the plurality of threads.

12. The apparatus of claim 11, wherein the reception status of the one or more bits is categorized as at least one of received, missed, and partially received.

13. The apparatus of claim 11, wherein the bit sequence is a received packet data unit (PDU) allotted with a sequence number (SN).

14. The apparatus of claim 11, wherein the processor is configured to detect, for each thread, the reception status from a Start_SN thread to an ACK_SN thread in at least one part of the bit sequence.

15. The apparatus of claim 11, wherein, for a thread containing a receiving side state variable (RX_NEXT), the status report is filled with CPT-000 format and for the remaining threads, the status report is filled with CPT-001 format.

16. The apparatus of claim 11, wherein based on the status report to be transmitted being truncated, the first truncated status report is sent with CPT-000, based on the status report being reported the variable (RX_NEXT) and the remaining parts of the status reports which are to be transmitted later are transmitted in blocks with CPT-001 format.

17. The apparatus of claim 11, wherein the status report enables the apparatus to not update a transmitting side state variable (TX_NEXT_ACK) based on the CPT value (CPT-001) being received.

18. The apparatus of claim 11, wherein the processor is configured to activate a status prohibit timer after transmission of all blocks of the status report to a lower layer.

19. The apparatus of claim 11, wherein the processor is configured to determine the plurality of threads based on one of a number of available cores, and a packet data unit (PDU) sequence number (SN) distribution logic.

20. The apparatus of claim 11, wherein each of the determined plurality of threads include a plurality of mutually exclusive PDU SNs.

* * * * *